United States Patent [19]

Helmig

[11] Patent Number: 5,540,286
[45] Date of Patent: Jul. 30, 1996

[54] LAWN EDGER WITH VERTICAL DRIVE ENGINE

[75] Inventor: Michael A. Helmig, Springtown, Tex.

[73] Assignee: Trimrite, Inc., Weatherford, Tex.

[21] Appl. No.: 279,481

[22] Filed: Jul. 22, 1994

[51] Int. Cl.$^6$ ............................ A01D 34/47; A01D 34/62
[52] U.S. Cl. ..................... 172/15; 123/195 A; 180/11; 180/19.1
[58] Field of Search ................. 172/13, 15; 56/11.8; 123/195 A; 180/11, 19.1

[56] References Cited

U.S. PATENT DOCUMENTS

| | | | |
|---|---|---|---|
| 2,739,437 | 3/1956 | True | 172/15 |
| 2,930,176 | 3/1960 | Lindell | 172/15 |
| 3,690,384 | 9/1972 | Patterson | 172/15 |
| 4,532,998 | 8/1985 | Feikema et al. | 172/15 |
| 5,165,485 | 11/1992 | Fujikawa et al. | 172/15 |

OTHER PUBLICATIONS

Trim-Rite Inc. "Manufacturers of Lawn and Garden Equipment" Brochure.

*Primary Examiner*—Spencer K. Warnick, IV
*Attorney, Agent, or Firm*—James E. Bradley

[57] ABSTRACT

A lawn edger utilizes an engine with a vertical drive shaft. The edger includes a frame mounted on wheels. A handle extends upward from the frame for pushing the frame on the wheels. The engine mounts to the frame with its drive shaft extending vertically downward. A drive pulley mounts to the output shaft. The blade carrier locates at the forward end of the edger and carries a blade on a blade axle. The driven pulley mounts to the blade axle. A drive belt extends between the drive pulley and the driven pulley, twisting as it extends around the pulleys.

7 Claims, 2 Drawing Sheets

LAWN EDGER WITH VERTICAL DRIVE ENGINE

BACKGROUND OF THE INVENTION

1. Field of the Invention

This invention relates in general to lawn care equipment and in particular to a lawn edger which utilizes a vertical drive engine.

2. Description of the Prior Art

The lawn edgers are the type concerned herein utilize a steel cutter blade for edging around sidewalks, curbs, driveways and the like. The prior art gasoline powered edger utilizes an internal combustion gasoline engine, normally four cycle. The engine mounts to a frame with its output shaft horizontal. The blade is carried by a blade brace forward of the engine. A drive pulley is mounted to the output shaft of the engine and a driven pulley is mounted to the shaft for the cutter blade. A belt extends between the pulleys for rotating the cutter blade. A spring will bias the brace to maintain tension on the belt.

In the normal cutting mode, the blade is vertical as well as the drive and driven pulleys. In some prior art lawn edgers, the operator can rotate the blade brace 90 degrees relative to the frame. When rotated, the blade will then be in a horizontal position for certain applications. When rotated, the belt twists.

These edgers work very well. However, they are fairly expensive. The major item of the cost is the cost of the engine with its horizontal output shaft. Lawn mower engines typically do not utilize a horizontal output shaft. Rather, a lawn mower engine will utilize a vertical shaft which directly couples to a horizontal blade located below the engine. Because of the volume manufactured, a lawn mower engine with a vertical drive shaft is less expensive than engines utilized for lawn edgers, which have horizontal drive shafts.

SUMMARY OF THE INVENTION

In this invention, a lawn edger is provided with a lawn mower type engine having a vertical drive shaft. The lawn mower engine mounts to an engine support on the frame. The vertical output shaft extends downward through an aperture in the engine support. A drive pulley mounts to the output shaft.

A blade carrier is mounted on a blade brace forward of the engine. A vertical blade is mounted to the blade carrier on a horizontal shaft. The horizontal shaft has a driven pulley. A flexible belt extends between the pulleys, forming a twist. A coil spring urges the brace for the blade carrier forward relative to the frame to maintain tension on the belt.

DETAILED DESCRIPTION OF THE INVENTION

Figure 1:
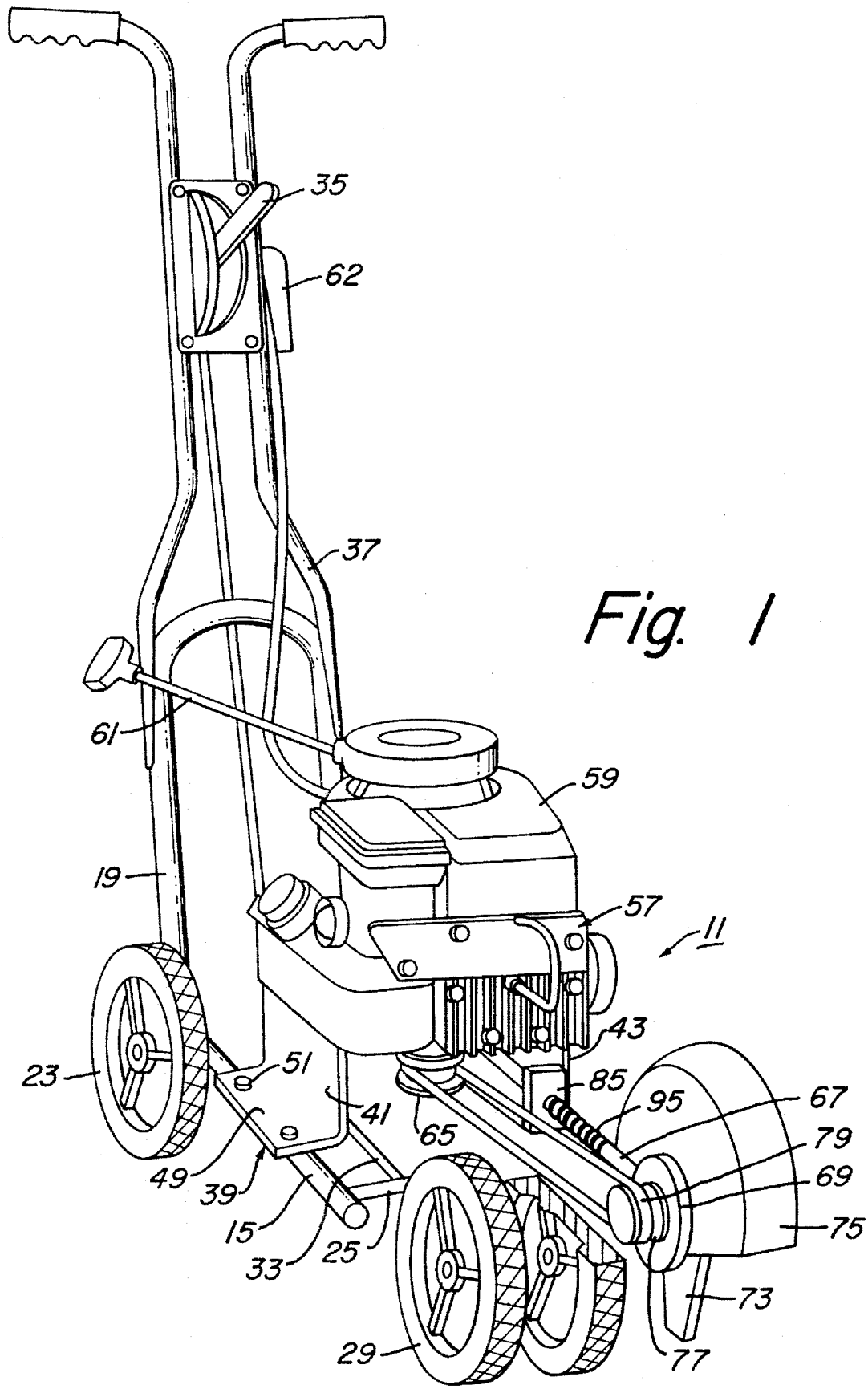
FIG. 1 is a prospective view illustrating a lawn edger constructed in accordance with this invention, with some of the components not shown for clarity.
Figure 2:
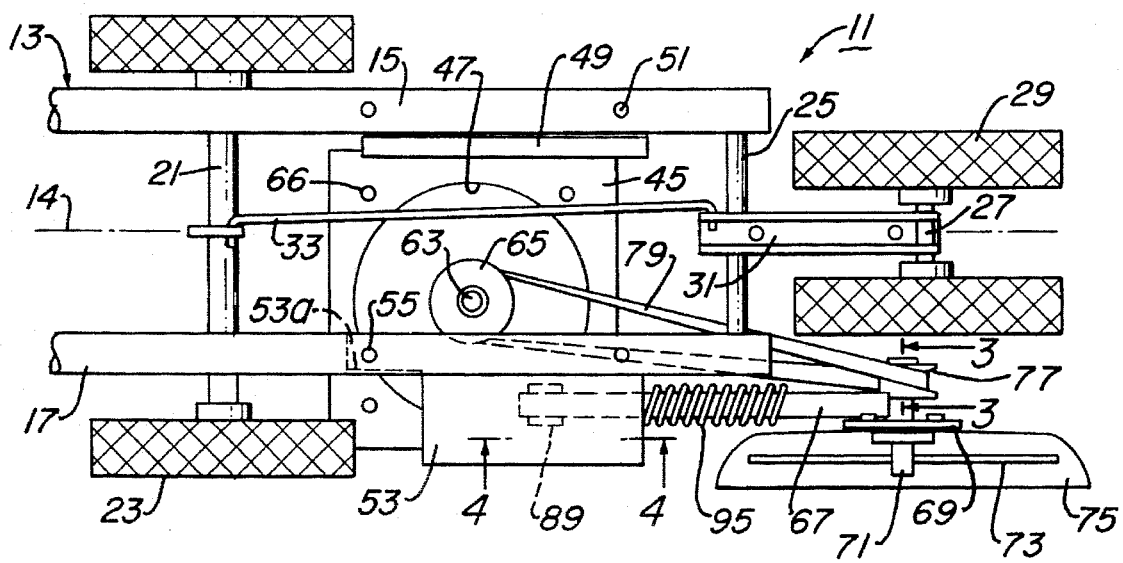
FIG. 2 is a bottom view of the lawn edger of FIG. 1.

Referring to FIG. 1, lawn edger 11 has a frame 13 with a longitudinal axis 14 (FIG. 2). Frame 13 includes a pair of longitudinal beams 15, 17 (FIG. 2.), preferably cylindrical tubes. Longitudinal axis 14 is centered between and parallel with longitudinal beams 15, 17. Frame 13 has a rearward portion 19 that is generally U-shaped and extends upward from the rearward ends of longitudinal beams 15, 17. The rearward portion 19 is integrally formed with the beams 15, 17 in the preferred embodiment. A rear axle 21, shown in FIG. 2, extends between beams 15, 17 in a horizontal plane when in normal use. Rear wheels 23 are rotatably mounted to rear axle 21 for rolling contact with the ground.

Frame 13 also includes a forward cross member 25 which extends between the forward ends of longitudinal beams 15, 17 parallel to rear axle 21. A short forward axle 27 is located forward of and parallel to forward cross member 25. Forward axle 27 supports at least one forward wheel 29, with two shown in the drawings. A pivotal support 31 pivotally mounts to forward cross member 25 and extends longitudinally forward, supporting forward axle 27. The longitudinal axis 14 intersects a centerpoint between the rearward wheels 23 and forward wheels 29 in the embodiment shown. A rod 33 and lever 35 (FIG. 1) can be employed to pivot the support 31 to raise and lower forward axle 27 for varying the height of the cut. As shown in FIG. 1, lever 35 mounts to a handle 37 that secures to the rear portion 19 of frame 13.

Referring to FIGS. 1 and 2, an engine support 39 mounts to the frame 13. Engine support 39 is an integral channel member having two parallel vertical side walls 41, 43. A horizontal support plate 45 (FIG. 2) integrally extends between the upper edges of side walls 41 and is spaced a substantial distance above longitudinal beams 15, 17. Support plate 45 is a flat plate having a circular aperture 47 extending through it. Engine support 39 has an outward turned flange 49 at the lower edge of side wall 41, as shown in FIG. 1, which overlays longitudinal beam 15. Flange 49 is bent to be parallel to support 45 and perpendicular to side wall 41. Two bolts 51 secure flange 49 to longitudinal beam 15.

Engine support 39 also has an inward turned flange 53 on the opposite side. The inward turned flange 53 forms the lower edge of side wall 43. Inward turned flange 53, as shown in FIG. 2, also is parallel to the support plate 45 and perpendicular to side wall 43. Inward turned flange 53 will overlay longitudinal beam 17. Inward turned flange 53 has a rearward tab 53A, shown by dotted lines in FIG. 2. Bolts 55 secure flange 53 to longitudinal beam 17.

Referring again to FIG. 1, a four cycle engine 57 of a type used with a lawn mower, mounts to engine support 39. Engine 57 is conventional, having a fuel tank 59, a rope starter 61, and a throttle control 62. Engine 57 has an output shaft 63, shown in FIG. 2, that is vertical, perpendicular to the wheel axles 21 and 27. Output shaft 63 extends downward through aperture 47 in support plate 45, terminating above longitudinal beams 15, 17. A drive pulley 65 is mounted to output shaft 63 for rotation therewith, and thus is in a horizontal position when edger 11 is in normal use.

Engine 57 bolts to support plate 45 by a plurality of bolts 66 shown in FIG. 2. Because of the outward turned flange 49 and inward turned flange 53, output shaft 63 is offset laterally from longitudinal axis 14 toward longitudinal beam 17. Output shaft 63 is centered between rear axle 21 and forward cross member 25, but it is not on longitudinal axis 14. Rather it is approximately halfway between longitudinal axis 14 and longitudinal frame member 17.

A blade brace 67 extends longitudinally forward from engine 57, laterally outboard of and parallel to longitudinal beam 17. A blade carrier or bearing 69 is located on the forward end of blade brace 67. Bearing 69 rotatably supports a blade axle 71 which is parallel to rear axle 21 and cross member 25. A blade 73 is mounted to blade axle 71 for rotation therewith. Blade 73 is vertical in conventional operation, perpendicular to output shaft 63. A safety shield 75 is stationarily mounted to bearing 69 and surrounds an upper and rearward portion of blade 73.

Figure 3:
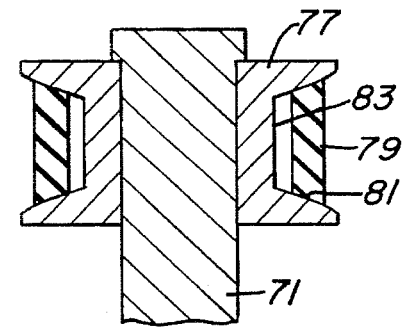
FIG. 3 is a sectional view of the driven pulley for the lawn edger of FIG. 1, taken along the line of 3—3 of FIG. 2
Figure 4:
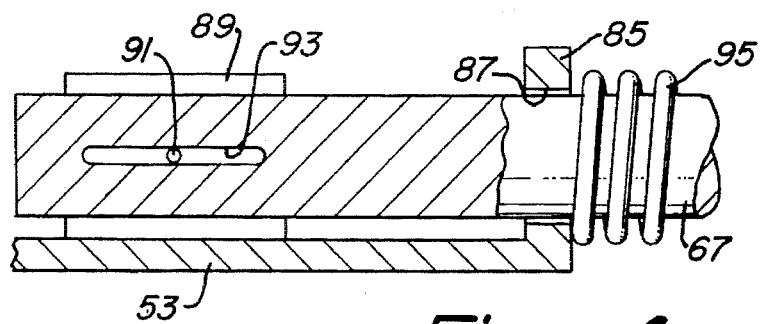
FIG. 4 is a sectional view of the belt tensioning system of the lawn edger of FIG. 1, taken along the line of 4—4 of FIG. 2.

A driven pulley 77, shown also in FIG. 3, is mounted to blade axle 71 for rotation therewith. Driven pulley 77 is located on the inboard side of safety shield 75 perpendicular to drive pulley 75. Driven pulley 77 is vertically oriented and located slightly farther outward from longitudinal axis 14 than longitudinal beam 17. Driven pulley 77 is driven by an elastomeric belt 79. Belt 79 extends around drive pulley 65 and around driven pulley 77. Belt 79 makes a twist as it extends between the pulley 65, 77 which are 90 degrees relative to each other.

Because drive pulley 65 and driven pulley 77 are not located on a line parallel to longitudinal axis 14, belt 79 runs at an acute angle relative to longitudinal axis 14. Belt 79 is not 90 degrees relative to blade shaft 71. A line from output shaft 63 through the center of driven pulley 77 is at an acute angle of about 10 degrees. A line from the inboard edge of drive pulley 65 to the center of driven pulley 77 is about 15 degrees, while a line from the outboard edge of drive pulley 65 to driven pulley 77 is about 5 degrees.

Belt 79 frictionally engages the internal sides 81 of driven pulley 77, which are tapered or conical. Belt 79 does not engage the base 83 of driven pulley 77, rather is spaced from base 83 by a clearance. Driven pulley 77 is identical to drive pulley 65. The frictional side engagement maintains belt 79 on the pulleys 65, 77 even though the center of driven pulley 77 is not aligned with drive pulley 65 on a line parallel to the longitudinal axis 14.

The tensioning means for applying tension to belt 79 includes a bias plate 85. Bias plate 85 is preferably integrally formed from side wall 43 and is located on the forward end of side wall 43. Bias plate 85 is vertically oriented and has a hole 87 extending through it. Blade brace 67 extends slidingly through hole 87. The rearward end of blade brace 67 locates slidingly within channels 89. Channels 89 extend upward from the flange 53. A pin 91 extends between channels 89 and through a elongated slot 93 formed in blade brace 67. Slot 93 allows longitudinal movement of blade brace 67 relative to channels 89 and thus the frame 13. Coil spring 95 locates on the forward side of bias plate 85. Coil spring 95 is compressed between a stop (not shown) on a forward portion of blade brace 67 and against the bias plate 85. Coil spring 95 urges blade brace 67 forward relative to frame 13 and thereby also urges blade axle 71 and driven pulley 77 to maintain tension on belt 79.

In operation, the edger 11 operates conventionally. The engine 57 when started rotates output shaft 63. Output shaft 63 rotates drive pulley 65. Belt 77 rotates driven pulley 77, which in turn rotates blade 73. The height is adjusted by lever 35 and rod 33 pivoting the pivotal support 31.

The invention has significant advantages. The use of a lawn mower engine with a vertical drive shaft allows a less expensive edger to be produced. Although the pulleys are oriented at a 90 angle from each other, the belt will stay on and accomplish its purpose.

Although the invention has been shown in only one of its forms, it should be apparent to those skilled in the art that it is not so limited, but is susceptible to various changes without departing from the scope of the invention. For example, the blade brace could be made rotatable for rotating the blade 90 degrees to a horizontal orientation for certain operations.

I claim:

1. A lawn edger, comprising in combination:

a frame having a pair of laterally spaced apart longitudinal beams;

a set of rear wheels mounted to a rearward portion of the frame and at least one forward wheel mounted to a forward portion of the frame, each of the wheels having a horizontal axis for rolling contact with the ground;

a handle extending upward from a rearward portion of the frame for pushing the frame on the wheels;

a mounting member having a flat support plate, an aperture therethrough, and extending side walls, the side walls having a lower end fastened to one of the beams with a fastening member;

a gasoline powered engine having an output shaft, the engine being mounted to the support plate, with the output shaft extending vertically downward between the side walls perpendicular to the axes of the wheels;

a drive pulley mounted to the output shaft above the beams for rotation with the output shaft;

a blade carrier brace comprising a rod, slidably mounted to the frame for longitudinal movement relative to the frame and extending forward of the engine in the longitudinal direction;

a blade shaft rotatably and horizontally carried at a forward end of the blade carrier brace, perpendicular to the output shaft;

a blade mounted to the blade shaft for rotation therewith;

a driven pulley mounted to the blade shaft;

a drive belt extending horizontally around the drive pulley, twisting and extending around the driven pulley for rotating the blade; and a coil spring mounted between the frame and the blade carrier brace for urging the blade carrier brace forward relative to the frame, for applying and maintaining tension in the belt.

2. The lawn edger according to claim 1, wherein:

the frame has a longitudinal axis; and the output shaft of the engine is laterally offset from the longitudinal axis.

3. The lawn edger according to claim 1, wherein:

the frame has a longitudinal axis;

the output shaft of the engine is laterally offset from the longitudinal axis; and the driven pulley is laterally offset from the longitudinal axis more than the output shaft.

4. A lawn edger, comprising in combination:

a frame having a pair of laterally spaced apart longitudinal beams and a longitudinal axis centered between and parallel to the beams;

a set of rear wheels mounted to a rearward portion of the frame and at least one forward wheel mounted to a forward portion of the frame, each of the wheels having a horizontal axis for rolling contact with the ground;

a handle extending upward from a rearward portion of the frame for pushing the frame on the wheels;

a channel member having a flat support plate, an aperture therethrough, and a pair of downward extending side walls, each terminating in a longitudinally extending flange at a lower edge, the flanges being fastened to the beams to position the support plate in a horizontal plane above the beams;

a gasoline powered engine having an output shaft, the engine being mounted to the support plate with the output shaft extending vertically downward through the aperture of the support plate, perpendicular to the axes of the wheels;

a drive pulley mounted to the output shaft below the support plate and above the beams for rotation with the output shaft, the output shaft being laterally offset from the longitudinal axis so as to position the drive pulley closer to one of the beams than the other;

a blade brace slidably mounted to the frame and extending forward of the engine in a longitudinal direction;

a blade shaft rotatably and horizontally carried at a forward end of the blade brace, perpendicular to the output shaft and perpendicular to the blade brace;

a blade mounted to the blade shaft for rotation therewith to perform edging;

a driven pulley mounted to the blade shaft for rotating the blade shaft, the driven pulley being laterally offset from the longitudinal axis in the same direction as but farther than the drive pulley;

a drive belt extending horizontally around the drive pulley, below the engine and above the beams, twisting and extending around the driven pulley for rotating the blade; and a coil spring mounted between the frame and the blade brace for urging the blade brace forward for applying and maintaining tension in the belt.

5. The edger according to claim 4 wherein the output shaft is located laterally between the beams and wherein the driven pulley is located laterally outboard of one of the beams.

6. The edger according to claim 4 wherein one of the flanges is outward turned and the other of the flanges inward turned in lateral directions so as to position the output shaft laterally offset from the longitudinal axis.

7. A lawn edger, comprising in combination:

a frame having a pair of laterally spaced apart longitudinal beams and a longitudinal axis centered between and parallel to the beams;

a set of rear wheels mounted to a rearward portion of the frame and at least one forward wheel mounted to a forward portion of the frame, each of the wheels having a horizontal axis for rolling contact with the ground;

a handle extending upward from a rearward portion of the frame for pushing the frame on the wheels;

a channel member having a flat support plate, an aperture therethrough, and a pair of downward extending side walls, the channel member being fastened to the beams with a fastening member to position the support plate in a horizontal plane above the beams;

a gasoline powered engine having an output shaft, the engine being mounted to the support plate with the output shaft extending vertically downward through the aperture of the support plate, perpendicular to the axes of the wheels;

a drive pulley mounted to the output shaft below the support plate and above the beams for rotation with the output shaft;

a blade brace slidably mounted to the frame and extending forward of the engine in a longitudinal direction;

a blade shaft rotatably and horizontally carried at a forward end of the blade brace, perpendicular to the output shaft and perpendicular to the blade brace;

a blade mounted to the blade shaft for rotation therewith to perform edging;

a driven pulley mounted to the blade shaft for rotating the blade shaft;

a drive belt extending horizontally around the drive pulley, below the engine and above the beams, twisting and extending around the driven pulley for rotating the blade; and a coil spring mounted between the frame and the blade brace for urging the blade brace forward for applying and maintaining tension in the belt.

* * * * *